United States Patent [19]
Olliges

[11] 4,145,043
[45] Mar. 20, 1979

[54] ANALOG TO DIGITAL VIDEO GAME CONVERSION

[75] Inventor: William E. Olliges, Barrington Hills, Ill.

[73] Assignee: Universal Research Laboratories, Inc., Elk Grove Village, Ill.

[21] Appl. No.: 750,620

[22] Filed: Dec. 15, 1976

[51] Int. Cl.² .................................................. A63F 9/02
[52] U.S. Cl. ................................. 273/1 E; 273/101.2; 273/DIG. 28; 358/93
[58] Field of Search .................... 35/11 R, 11 A, 12N; 273/1 E, 85 R, 86 B, 102.2 R, 101.2, DIG. 28; 340/324 A, 324 AD, 323 R; 358/93, 104

[56] References Cited
U.S. PATENT DOCUMENTS

| | | | |
|---|---|---|---|
| 3,643,345 | 2/1972 | Wilton et al. | 35/12 N |
| 3,697,681 | 10/1972 | McCoy | 35/12 N X |
| 3,874,669 | 4/1975 | Ariano et al. | 273/85 R |
| 3,961,133 | 6/1976 | Bennett | 35/12 N X |
| 3,996,673 | 12/1976 | Vorst et al. | 35/12 N X |
| 4,026,555 | 5/1977 | Kirschner et al. | 273/102.2 R |
| 4,034,990 | 7/1977 | Baer | 273/85 G |

*Primary Examiner*—Vance Y. Hum
*Attorney, Agent, or Firm*—George H. Gerstman

[57] ABSTRACT

Analog video signals representative of a video picture are generated by a video camera or the like, and the analog video signals are digitized. The digitized analog video signals are fed to a coincidence gating circuit, to which manually operable digitally generated signals are also fed. The analog video signals are mixed with the output signals from the coincidence gating circuit and are fed to a cathode ray tube for display.

15 Claims, 7 Drawing Figures

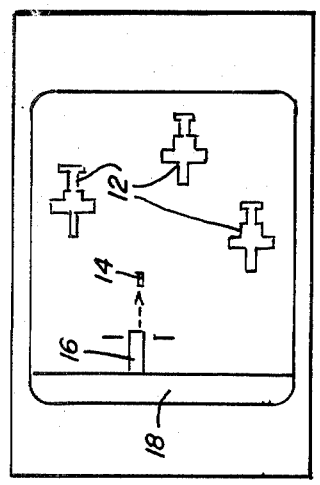
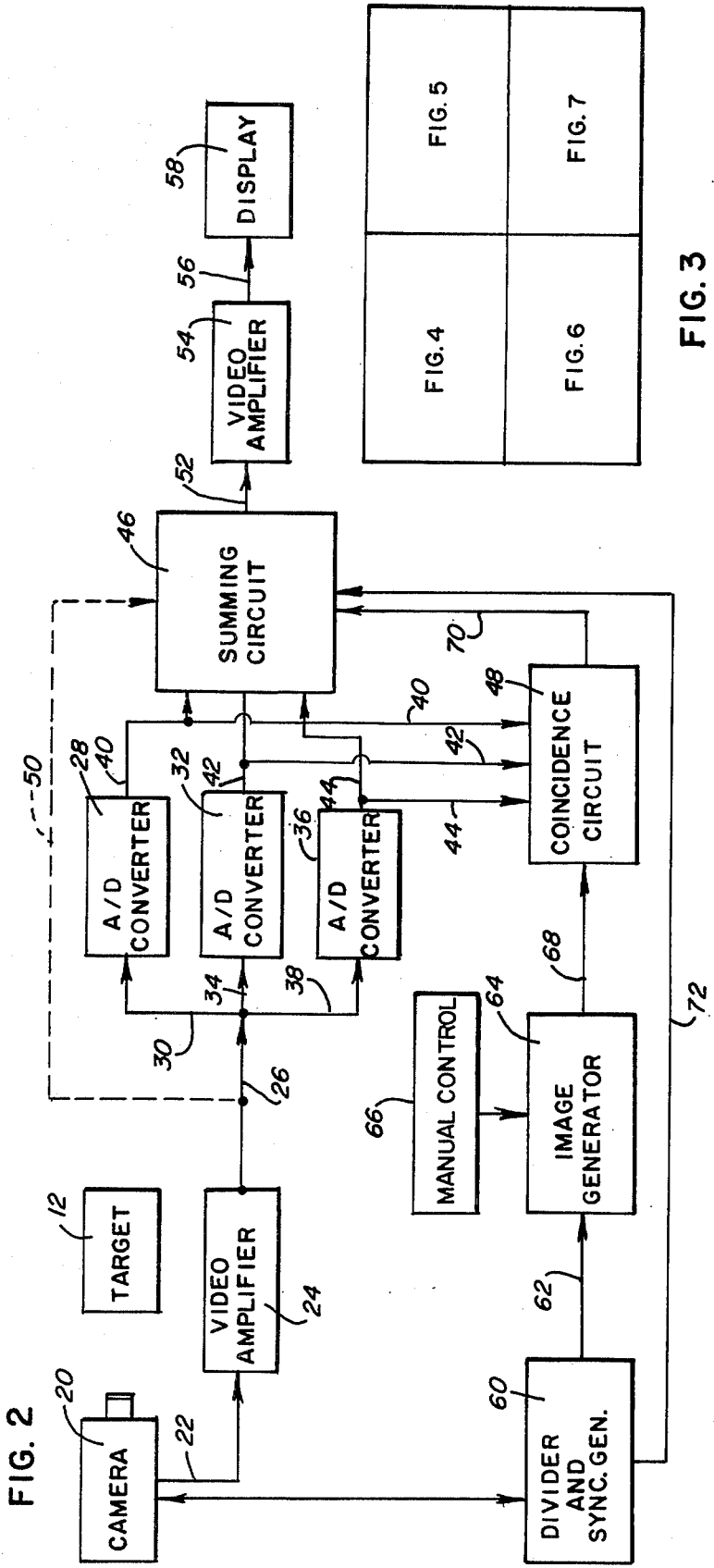

ANALOG TO DIGITAL VIDEO GAME CONVERSION

BACKGROUND OF THE INVENTION

This invention relates to electronic entertainment devices which employ display devices for displaying a picture that is, at least in part, manually controlled.

Electronic games employing cathode ray tubes on which digitally generated pictures are displayed and in which the coincidence between one digitally displayed object and another digitally displayed object provides a result, such as a score and/or a sound effect, are well-known in the art. Such devices include various types of target games, in which the coincidence of a digitally displayed object with a digitally displayed target will provide an appropriate result.

I have discovered that a more entertaining electronic game can be provided if one of the displayed objects, e.g., the target, is more realistic than the typical target that is digitally generated. I have also discovered that a realistic target for objects can be provided without the need for programming a circuit for digitally generating such a target or object.

It is, therefore, an object of the invention to provide an electronic entertainment device in which a realistic target or object is displayed.

Another object of the present invention is to provide an electronic entertainment device in which the target or object being displayed requires no pre-programmed digital circuitry.

A further object of the present invention is to provide an electronic entertainment device in which the coincidence of manually operated digitally generated objects with an analog generated object is displayed.

A still further object is to provide an electronic entertainment device in which an analog picture may be displayed on a cathode ray tube and a manually controlled digitally generated object is moved in relation to the analog picture with the coincidence of the digitally generated object and the analog picture providing a result or score.

Another object of the present invention is to provide an electronic entertainment device which includes a circuit for digitizing analog video signals and for applying the digitized analog video signals and manually operable digitally generated signals to a coincidence gating circuit.

A still further object of the present invention is to provide an electronic entertainment device which is relatively simple in construction yet may provide infinitely variable objects or targets to which coincidence is desired.

Other objects and advantages of the present invention will become apparent as the description proceeds.

SUMMARY OF THE INVENTION

In accordance with the invention, an entertainment device is provided which uses a display device capable of providing a visible display in response to electrical signals fed to it. The improvement comprises means for generating an analog video signal representative of a video picture. Means are provided for digitizing the analog video signal. Means are also provided for generating a digital video signal and gating means are provided for receiving the digitized analog video signal and the digital video signal. The gating means are operable to control the visible display on the display device with the gating means being responsive to coincidence of the digitized analog video signals and the digital video signals. Means are provided for coupling to the display device either the analog video signal and the output of the gating means or the digitized analog video signal and the output of the gating means.

In one embodiment, the display device comprises a cathode ray tube and the analog video signal generating means comprises a video camera. The digitizing means comprises means for providing a first output signal in response to dark tones represented by the analog video signal and means for providing a second output signal in response to light tones represented by the analog video signal.

In one embodiment, the digital signal generating means comprises a square wave generator and a manually controlled image generator coupled to the output of the square wave generator. The image generator modulates the square waves to provide digital video signals representative of a selected object, and the manual control is operative to move the selected object on the cathode ray tube in a selected manner.

In one embodiment, the coupling means includes a summing circuit for mixing the output of the gating means with either the analog video signal or the digitized analog video signal.

A more detailed explanation of the invention is provided in the following description and claims, and is illustrated in the accompanying drawings.

BRIEF DESCRIPTION OF THE DRAWINGS

FIG. 1 is a schematic view of a cathode ray tube displaying pictures in accordance with the principles of the present invention;

FIG. 2 is a schematic block diagram of the circuitry for an entertainment device constructed in accordance with the principles of the present invention;

FIG. 3 shows in general how FIGS. 4, 5, 6 and 7 may be connected together to form a schematic circuit diagram of an entertainment device constructed in accordance with the principles of the present invention.

DETAILED DESCRIPTION OF THE ILLUSTRATIVE EMBODIMENT

Figure 4:
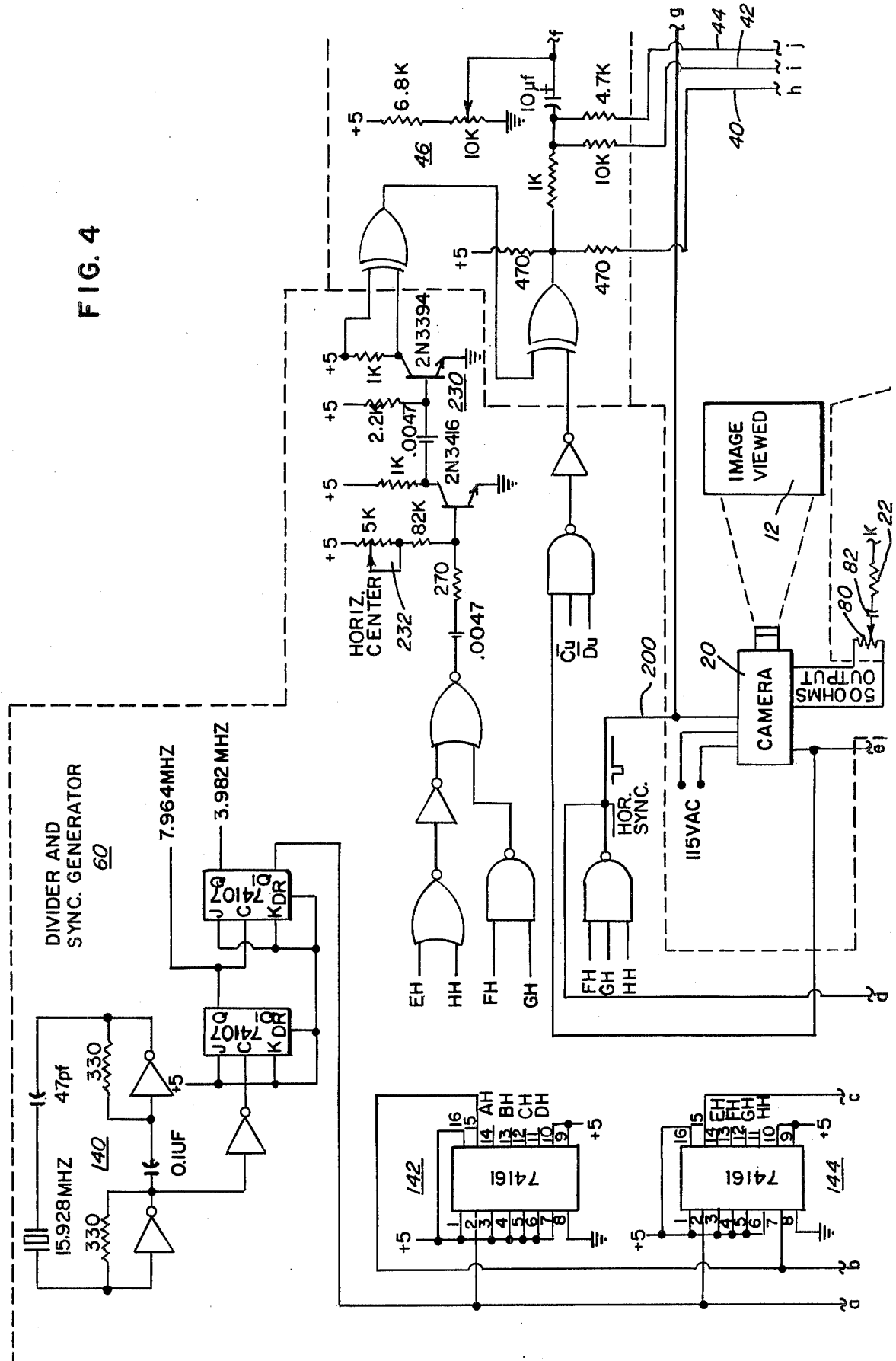
FIGS. 4, 5, 6 and 7, when connected together as indicated in FIG. 3, form a schematic circuit diagram of an illustrative embodiment of the invention.

In FIG. 1 there is shown a representation of a typical display provided by an electronic game constructed in accordance with the principles of the present invention. Thus cathode ray tube 10 displays a plurality of objects 12, which objects 12 are originally analog generated. Objects 12 may be one or more airplanes, or automobiles, or any other type of target or object which may be deemed interesting in an electronic game. Objects 12 are originally analog generated, that is, they were originally photographed using a video camera and analog video signals are provided from the video camera, or from a video tape player or from some other means for generating the analog video signals.

In the illustrative embodiment, the game to be displayed is the firing of bullets toward airplanes. Thus objects 12, which are originally analog generated, are airplanes and digitally generated bullets 14 are fired from the representation of a gun 16 which extends from blanked portion 18 of the cathode ray tube. By manual adjustment, the operator can move gun 16 vertically and upon pulling a trigger, a representation of a bullet 14 will travel horizontally toward objects 12. If there is coincidence between bullets 14 and objects 12, an explosive sound effect may be generated and/or a visual signal, such as a numeral score, may be displayed on the cathode ray tube 10.

FIG. 2 is a block diagram of a circuit which accomplishes the generation of the electronic display game of FIG. 1. Referring to FIG. 2, a video camera 20 photographs target 12 and the analog video signals are fed from camera 20 via line 22 to a video amplifier 24, from which they are fed via line 26 to an analog to digital converter 28 (via line 30), to an analog to digital converter 32 via line 34, and to an analog to digital converter 36 via line 38.

Analog to digital converter 28 provides an output signal on line 40 for black tones, analog to digital converter 32 provides an output signal on line 42 for grey tones and analog to digital converter 36 provides an output signal on line 44 for white tones. The digital signals provided on lines 40, 42 and 44 are fed to a summing or mixing circuit 46 and are also fed to a coincidence gating circuit 48. Of course, where finer resolution is desired, additional analog to digital converters may be used to provide digital signals representing various shades of grey.

In some instances, it may be desirable for objects 12 to be displayed digitally, by digitizing the analog signals on line 26 and transmitting such digitized signals to summing or mixing circuit 46. On other occasions, it may be desirable for objects 12 which are displayed to be the analog pictures and not the digital representation thereof. To this end, a bypass line 50 is used to feed the analog video signals on line 26 directly to the summing circuit, thereby bypassing the analog to digital converters. A selector switch may be provided so that when bypass line 50 is used, lines 40, 42 and 44 are disconnected from the summing circuit. Summing circuit 46 is a video mixer which provides the proper sync signals of black and white and grey level for the cathode ray tube display. The output of summing circuit 46 is fed via line 52 to a video amplifier 54 from which it is fed via line 56 to cathode ray tube display 58.

Bullets 14 and gun 16 are generated digitally by means of a frequency divider and sync generator circuit 60 that feeds square waves via line 62 to an image generator 64. Image generator 64 has a manual control 66 and operates to modulate the square waves on line 62 and to provide digital video signals on line 68 corresponding to bullets 14 and gun 16, with the vertical positioning of gun 16 (and bullets 14) being manually controlled.

The digital video signal on line 68 is fed to coincidence circuit 48 which provides an output signal on line 70 that is responsive to the coincidence of the digital signals on line 68 and the digitized analog video signals on lines 40, 42 and 44. Line 70 is connected to summing circuit 46 to provide the digital video signals representing the gun and bullets.

Sync signals from the divider and sync generator 60 are fed directly to summing circuit 46 via line 72. This provides proper blanking and positioning of the displayed items.

Figure 5:
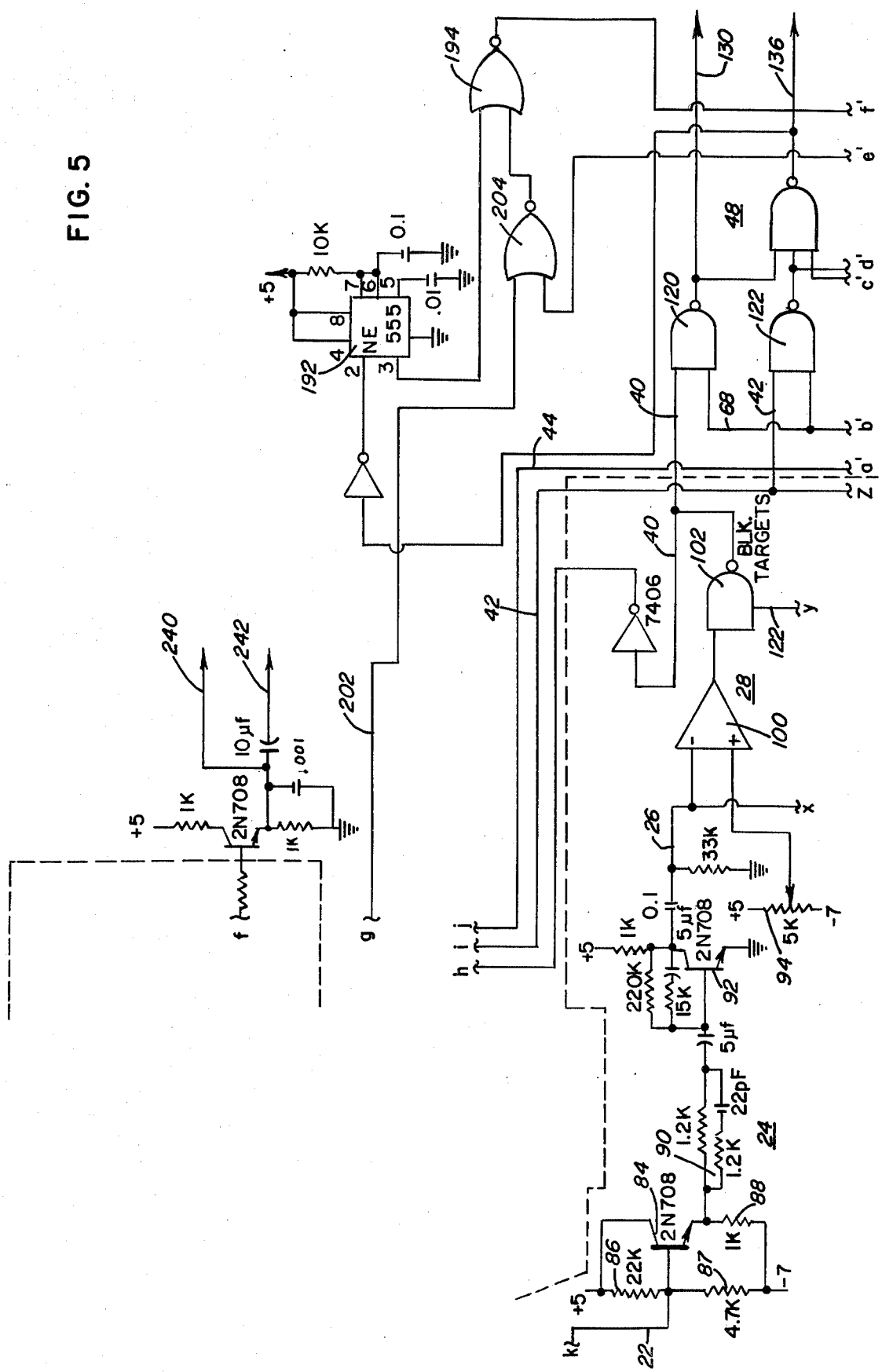
Figure 6:
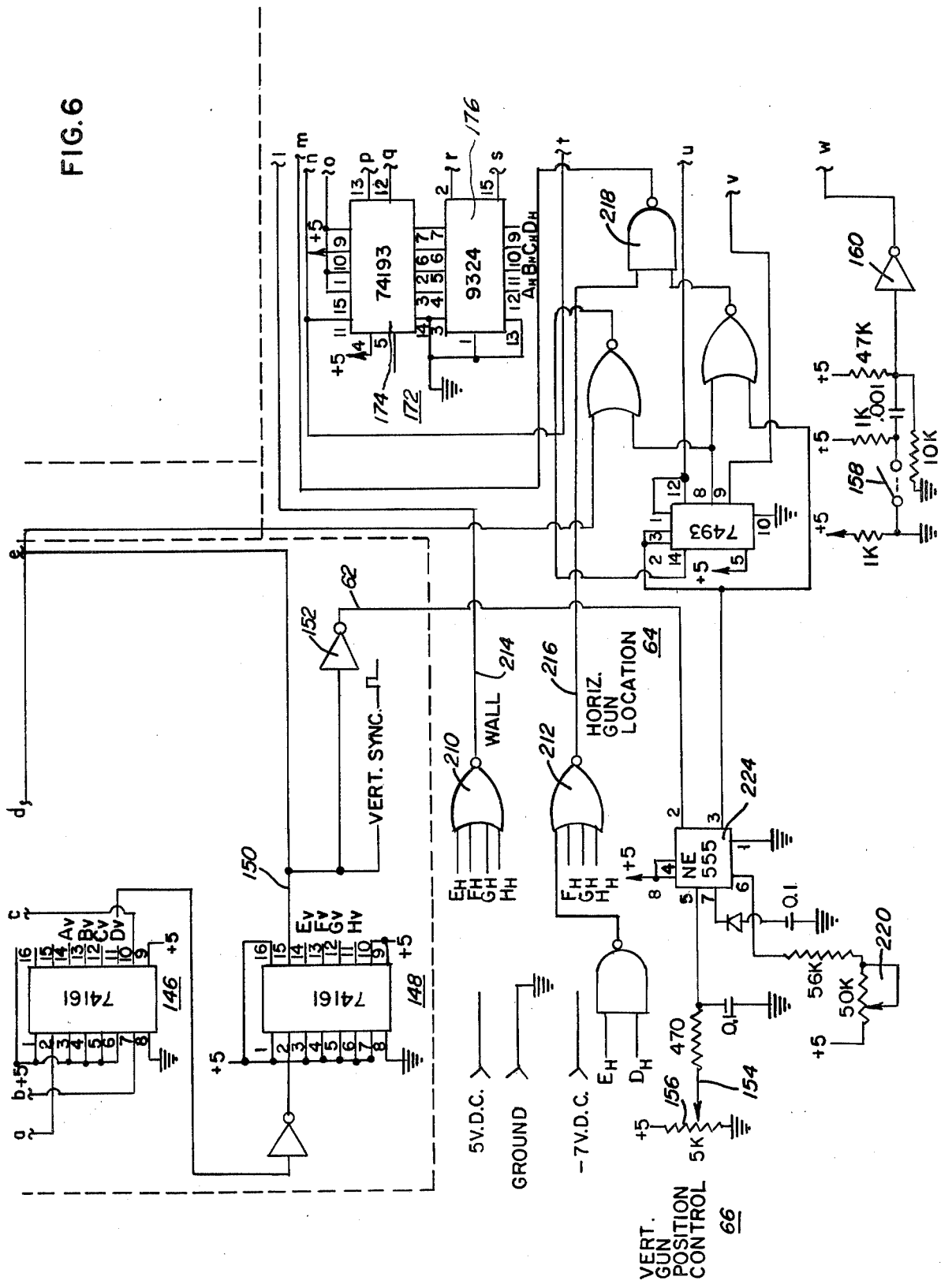
Figure 7:
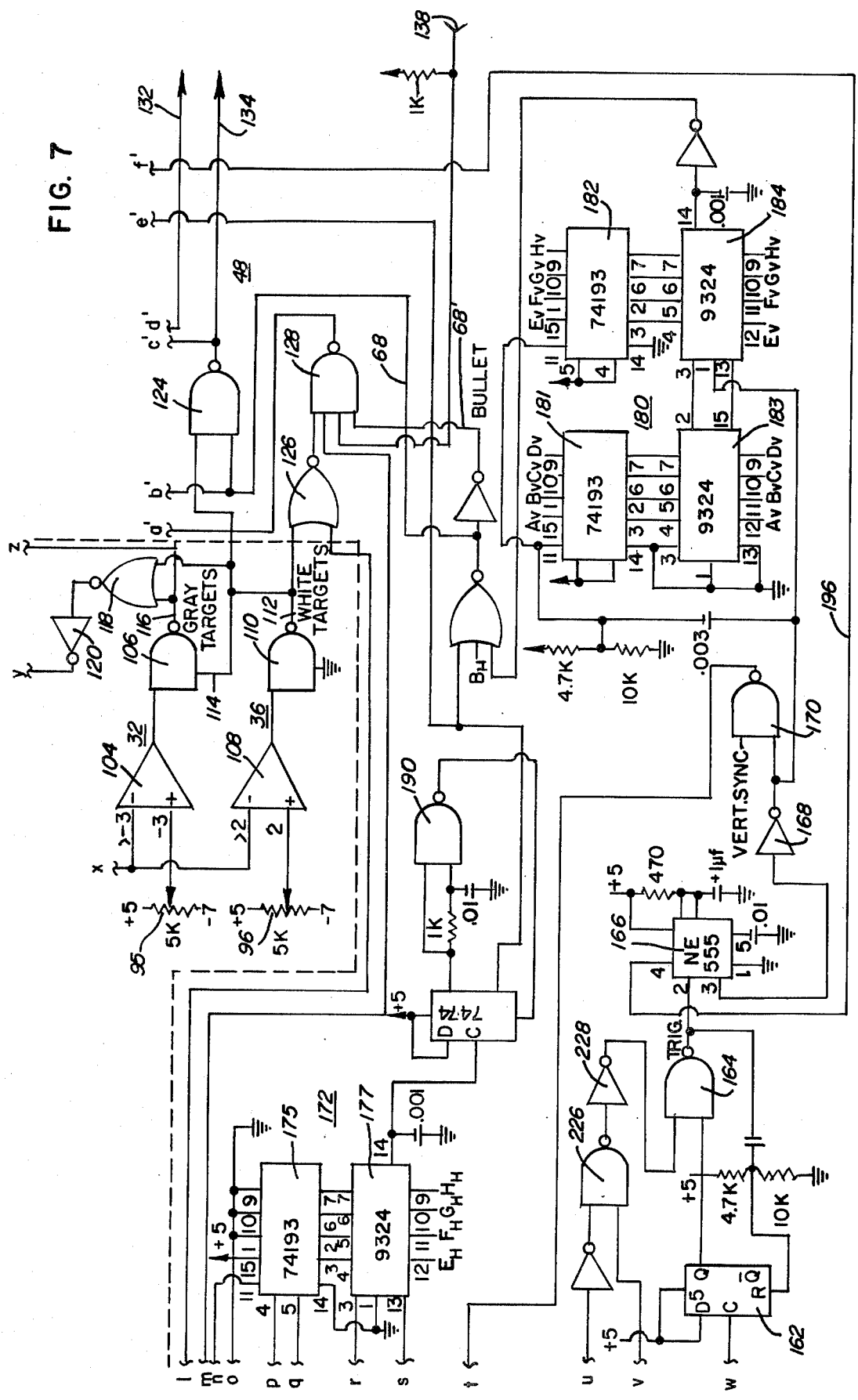

The components forming the block diagram of FIG. 2 are shown in detail on FIGS. 4-7 which should be connected together in the manner illustrated in FIG. 3 to form the complete circuit diagram. In order for the Figures to be connected to form a complete circuit diagram, lines a, b, c, d and e of FIG. 1 are connected to lines a, b, c, d and e of FIG. 6, lines f, g, h, i, j and k of FIG. 4 are connected to lines f, g, h, i, j and k of FIG. 5, lines l, m, n, o, p, q, r, s, t, u, v and w of FIG. 6 are connected to lines l, m, n, o, p, q, r, s, t, u, v and w, respectively, of FIG. 7 and lines x, y, z, a', b', c', d', e' and f' of FIG. 5 are connected, respectively, to lines x, y, z, a', b', c', d', e' and f' of FIG. 7.

For purposes of illustration, many of the component values are given in the FIGS. 4-7 circuit. It is to be understood that such component values are for illustrative purposes only, and other circuits, components and values may be used without departing from the spirit and scope of the present invention.

Referring now to the circuit diagram, camera 20 photographs objects 12 and the analog video output signal is fed via the 50 ohm transmission line to a potentiometer 80. The signal is AC coupled via capacitor 82 and fed to a current amplifying circuit including NPN transistor 84 and resistors 86, 87 and 88. Transistor 84 is biased to shift the level of the output current from the camera and the output of transistor 84 is fed through an equalization circuit 90 to a voltage amplifying circuit including NPN transistor 92 with its temperature stabilization circuitry and gain control circuitry, all as is well-known in the art. The output of the second amplifier stage is then fed to analog to digital converter circuits 28, 32 and 36, each of which comprises an amplifier and a NAND gate.

The input potentiometers 94, 95 and 96 to the analog to digital converter circuits are adjusted so as to determine the level for digitizing the analog signals. Thus potentiometer 94 is adjusted so that all signals above a certain value will be amplified by amplifier 100 and gated through NAND gate 102. Likewise, potentiometer 95 is set so that all signals above a predetermined amount will be amplified by amplifier 104 and gated through NAND gate 106. Potentiometer 96 is set so that all signals above a predetermined amount will be amplified by amplifier 108 and gated through NAND gate 110.

NAND gates 102, 106 and 110 are connected to each other in a manner to inhibit certain operations. For example, when the white NAND gate 110 is operating, the operation of the grey and black NAND gates 106 and 102 is inhibited, when the grey NAND gate 106 is operating, the operation of the black NAND gate 102 is inhibited. To this end, the output 112 of white NAND gate 110 is coupled to an inhibit input 114 of NAND gate 106 and the output 116 of grey NAND gate 106 is coupled through a NOR gate 118 and an inverter 120 to the inhibit input 122 of black NAND gate 102. While the inhibit inputs 122 and 114 of the black and grey NAND gates 102 and 106, respectively, are not grounded, the inhibit input of white NAND gate 110 is connected to ground. In effect, the inhibit input of NAND gate 110 is the same as the enable input of NAND gate 110.

The output 40 of black NAND gate 102 and the output 42 (or 116) of grey NAND gate 106 is fed to summing circuit 46. The output 112 of white NAND gate 110 is fed with other digital information (such as the digital signals representing the bullets and the digital signals representing the score or other type of reward information) to summing circuit 46. In the illustrative embodiment, all of the other information, such as the score, bullets, etc., are white and thus such information is fed with the white digitized target information to the summing circuit via line 44.

It is to be understood that a bypass circuit may be provided, whereby the amplified analog video signals on line 26 are fed directly to summing circuit 46. As stated above, in this manner the original analog picture will be presented on the cathode ray tube display, which many persons might find more enjoyable than the presentation of the digitized representation of the analog picture.

Although in the illustrative embodiment the digital signals representing the bullets, score, etc. is represented as white on the cathode ray tube, the bullets, score, etc. could be black and then the digitally generated bullets and other information would be fed with the digitized black target information via line 40 to summing circuit 46.

The digitized analog video signals are also fed to coincidence gating circuits 48. Thus the digitized analog video signal from NAND gate 102 is fed to NAND gate 120, the digitized analog video signal from NAND gate 106 is fed to NAND gate 122 and the digitized analog video signal from NAND gate 110 is fed to NAND gate 124 and also to NOR gate 126 which is coupled to NAND gate 128. The output line 44 from NAND gate 128 is connected to summing circuit 46.

Digital video signals representing bullets, which are generated in the manner described below, are fed via line 68 to the other inputs of NAND gates 120, 122 and 124. If there is coincidence with a bullet and a black target, an output signal will be provided on line 130. If there is coincidence with a bullet and a grey target, a signal will be provided on line 132. If there is coincidence with a bullet and a white target, a signal will be provided on line 134. As long as there is coincidence of a bullet with any of the targets, a signal will be provided on line 136.

Scoring may be accomplished by certain delegations of points. For example, a signal on line 130 might provide 30 points, a signal on line 132 might provide 20 points, a signal on line 134 might provide 10 points and a signal on line 136 might be used as a sound trigger to connote a hit. The signals on lines 130, 132, 134 and 136 are fed to conventional scoring and sound generator circuitry. The scoring may be displayed on the cathode ray tube with the other signals by feeding the output of the conventional score generating circuit to an auxiliary input 138.

The generation of the digital signals will now be described. The divider and sync generator circuit 60 includes a conventional master oscillator 140 coupled through conventional frequency divider circuits 142, 144, 146 and 148 for producing square waves having predetermined frequencies. These frequencies are used for generating the digital signals. The square waves at output 150 of the frequency divider chain are fed through inverter 152 and via line 62 to the image generator circuitry 64 with the manual control circuitry 66 coupled thereto.

Image generator 64 projects the image on the cathode ray tube, with a white wall 18 at the left of the screen and a vertically traveling gun 16 extending from the wall with a bullet 14 that can be fired from the gun. Manual control circuit 66 is a circuit for vertically positioning gun 16 on the cathode ray tube. By varying arm 154 of potentiometer 156, the image of gun 16 will lower and rise with respect to the cathode ray tube 10. In actual use, the operator would move a gun or other type of level which is coupled to potentiometer 156 to move the arm 154 thereof.

The gun could have a "trigger" 158 which, when actuated, fires a digitally generated bullet 14 from the gun 16 on the cathode ray tube. The trigger signal for the bullet is fed through inverter 160 to a flip-flop 162, the output of which is fed via NAND gate 164 to a timing circuit 166. Timing circuit 166 is a one-shot multivibrator, the output of which is fed via inverter 168 and NAND gate 170 to a horizontal bullet motion control circuit 172 comprising four integrated circuits. These four integrated circuits include counters 174, 175 and comparators 176, 177.

The output of inverter 168 is also coupled to a vertical motion circuit 180, comprising four integrated circuits. These four integrated circuits include counters 181, 182 and comparators 183, 184.

Horizontal bullet motion control circuit 172 controls the horizontal speed of the bullet 14 across the cathode ray tube and vertical motion circuit 180 controls the vertical relationship of the bullet with the gun. Vertical motion circuit 180 is necessary to prevent the bullet 14 from moving up and down during its flight, when the gun 16 is moved up and down. Thus, once the trigger 158 is operated, the bullet will continue in the same path notwithstanding vertical movement of the gun 16. Once the gun is triggered again, the bullet will commence from the vertical position of the gun at the time that the trigger 158 is actuated. The bullet horizontal control circuit signals and the bullet vertical control circuit signals are fed to pre-video mixing NAND gates 190 and 128 which combine all of the signals before they are fed to the final video summing circuit 46.

Timing circuit 166 is set for a long enough time to allow the bullet to travel from the left-hand side of the cathode ray tube to the right-hand side thereof. Another timer 192 (FIG. 5) has a shorter timing cycle than timer 166. The shorter timing cycle timer 192 is a reset timer which, when coincidence occurs, feeds back a reset signal to timing circuit 166 via NOR gate 194 and line 196. The reset signal on line 196 effectively terminates the bullet display when there is coincidence. If the reset signal were not provided, after coincidence the bullet would continue to be shown traveling across the cathode ray tube notwithstanding the coincidence.

A horizontal sync signal is provided via line 200 (FIG. 4), line 202 (FIG. 5) and is fed through NOR gates 204 and 194 to reset the timing circuit 166 if and when the bullet has coincidence with the horizontal sync. In this manner, the bullet 14 will not appear to continue to go from left to right on the cathode ray tube and then come around left to right again and continue to travel once it has gone from left to right. Thus timing circuits 166 and 192 cooperate to reset the bullet timing by either coincidence of the bullet with the black, grey or white target or by coincidence of the bullet with the horizontal sync.

Referring to FIG. 6, NOR gates 210 and 212 shown therein have inputs from integrated circuit 144 of the frequency divider chain as indicated by the letters. The signal on line 214 provides the digital signals for the white wall 18 on the left side of the screen and the signal on line 216 provides the signals for the image of the white gun 16 adjacent wall 18. The signals on line 214 are coupled to an input of NOR gate 126 and the signals on line 216 are coupled through NAND gate 218 to an input of NAND gate 128. A trimmer potentiometer 220 (FIG. 6) is provided to adjust the bottom limit of the travel of gun 16. Potentiometer 156 and trimmer potentiometer 220 and the inverted square waves on line 62 from the frequency divider circuitry are coupled to a timing circuit 224, the output of which is coupled to NAND gate 226. The output of NAND gate 226 is inverted through inverter 228 and is fed to the other input of NAND gate 164.

Referring to FIG. 4, a horizontal centering circuit 230 is provided in the sync generator circuitry for adjusting the positioning of objects 12, bullets 14, gun 16 and wall 18 with respect to the cathode ray tube. By adjusting potentiometer 232, the items displayed on the screen can be moved horizontally so that all of the items will be properly centered on the cathode ray tube screen.

Summing circuit 46 is a conventional mixing circuit for cathode ray tube display, with the DC composite picture signal being on line 240 (FIG. 5) and the AC composite picture signal being on line 242.

A novel system has been described which provides a result from the coincidence of a digitally generated signal with an original analog signal that is digitized. The digitally generated signal and the digitized analog signal are fed to a coincidence gating circuit in order to provide selected outputs as a result of coincidence, but the original analog video signal may be displayed on the cathode ray tube or, if desired, the digitized original analog video signal may be displayed. While the illustrative embodiment relates to a digitally generated gun which fires digitally generated bullets at an original analog generated picture of planes, numerous other displays are possible using the principles of the present invention. Thus although an illustrative embodiment has been shown and described, it is to be understood that various modifications and substitutions may be made by those skilled in the art without departing from the novel spirit and scope of the present invention.

What is claimed is:

1. An entertainment device which uses a display device capable of providing a visible display in response to electrical signals fed to it, the improvement comprising: means for generating an analog video signal representative of a video picture; means for digitizing said analog video signal; means for generating a digital video signal; said digital signal generating means comprising square wave generating means and a manually controlled image generator coupled to the output of said square wave generating means for modulating the square waves generated by said square wave generating means to provide digital video signals representative of a selected object; gating means; and means for feeding said digitized analog video signal and said digital video signal to said gating means for controlling the visible display on said display device, said gating means comprising a coincidence circuit operable to provide a predetermined output in response to coincidence of said digitized analog video signals and said digital video signals; and means for coupling to said display device said analog video signal and the output of said gating means.

2. An entertainment device as described in claim 1, wherein said display device comprises a cathode ray tube and said analog video signal generating means comprises a video camera.

3. An entertainment device as described in claim 1, wherein said display device comprises a cathode ray tube and said analog video signal generating means comprises a video recording-medium player.

4. An entertainment device as described in claim 1, wherein said digitizing means comprises means for providing a first output signal in response to dark tones represented by said analog video signal and means for providing a second output signal in response to light tones represented by said analog video signal.

5. An entertainment device as described in claim 4, wherein said digitizing means further comprises means for generating a third output signal in response to intermediate tones represented by said analog video signal.

6. An entertainment device as described in claim 5, wherein said dark tones are substantially black, said intermediate tones are grey and said light tones are substantially white.

7. An entertainment device as described in claim 1, wherein said digitizing means comprises a plurality of analog to digital converters each of which is responsive to different tones represented by said analog video signal, to produce different output signals for different tone ranges.

8. An entertainment device as described in claim 7, said gating means comprising a coincidence circuit operable to provide one output signal in response to coincidence of said digital video signals with the digitized analog video signals corresponding to one tone range and to provide a different output signal in response to coincidence of said digital video signals with the digitized analog video signals corresponding to a different tone range.

9. An entertainment device as described in claim 8, wherein said one tone range is substantially black and said different tone range is substantially white.

10. An entertainment device as described in claim 1, wherein said manual control is operative to move said selected object on said display device in a selected manner.

11. An entertainment device as described in claim 1, wherein said coupling means comprises a selector device which, in a first position, bypasses said digitizing means to couple said analog video signal to said display device and in a second position said bypass is inoperative.

12. An entertainment device as described in claim 1, wherein said coupling means includes a summing circuit for mixing the output of said gating means with one of said analog video signal and said digitized analog video signal.

13. An entertainment device which uses a cathode ray tube and which comprises: means for generating an analog video signal representative of a video picture; means for digitizing said analog video signal, said digitizing means comprising means for providing a first output signal in response to dark tones represented by said analog video signal and means for providing a second output signal in response to light tones represented by said analog video signal; means for generating a digital video signal, said digital signal generating means comprising a square wave generator and a manually controlled image generator coupled to the output of said square wave generator for modulating the square waves generated by said square wave generator to provide digital video signals representative of a selected object, said manual control being operative to move said selected object on said cathode ray tube in a selected manner; gating means for controlling the visible display on said cathode ray tube, said gating means being responsive to coincidence of said digitized analog video signals and said digital video signals, said gating means comprising a coincidence circuit operable to provide one output signal in response to coincidence of said digital video signal with the digitized analog video signals corresponding to dark tones and to provide a different output signal in response to coincidence of said digital video signal with the digitized analog video signals corresponding to said light tones; and means for coupling to said cathode ray tube (a) one of said analog video signal and said digitized analog video signal and (b) the output of said gating means.

14. An entertainment device as described in claim 13, wherein said coupling means comprises a selector device which, in a first position, bypasses said digitizing means to couple said analog video signal to said display device and in a second position said bypass is inoperative.

15. In an entertainment device in which a cathode ray tube displays selected objects and the result of coincidence thereof, and one of said objects is manually controlled, the improvement comprising, in combination: means for generating an analog video signal representative of a video picture; means for digitizing said analog video signal; said digitizing means comprising means for providing a first output signal in response to dark tones represented by said analog video signal and means for providing a second output signal in response to light tones represented by said analog video signal; a coincidence circuit; means for feeding to said coincidence circuit said digitized analog signal; means for feeding to said coincidence circuit manually controllable digital signals; said digital signal feeding means comprising square wave generating means and a manually controlled image generator coupled to the output of said square wave generating means for modulating the square waves generated by said square wave generating means to provide digital video signals representative of a selected object; means for coupling said analog video signal to the cathode ray tube; and means for coupling the output of said coincidence circuit to the cathode ray tube.

* * * * *